Patented Nov. 9, 1926.

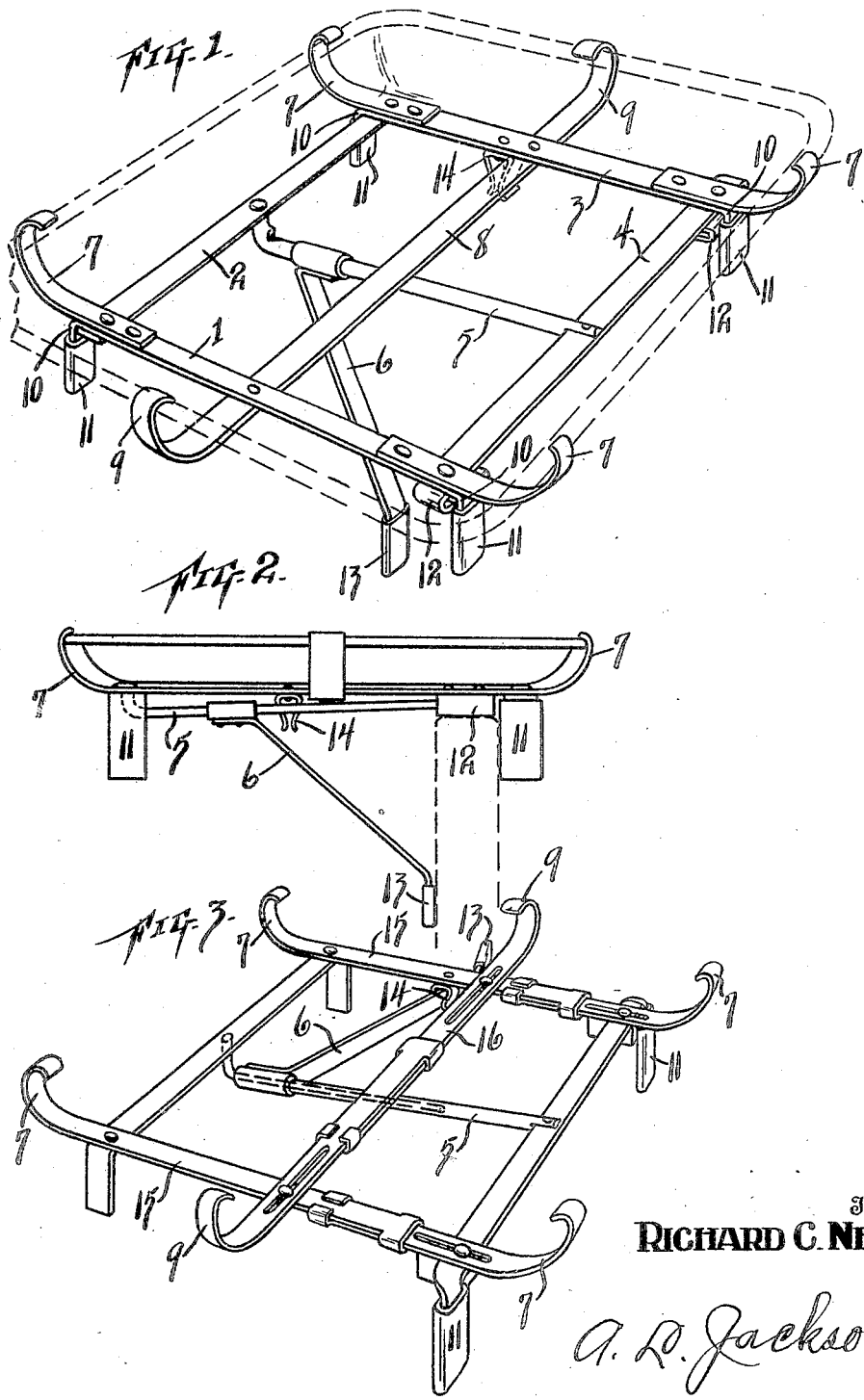

1,606,441

UNITED STATES PATENT OFFICE.

RICHARD C. NELMS, OF DALLAS, TEXAS.

DETACHABLE TRAY SUPPORT.

Application filed July 30, 1926. Serial No. 125,909.

My invention relates to tray supports and more particularly to supports for carrying and supporting service trays on vehicle bodies; and the object is to provide a convenient and useful support in which a tray can be quickly mounted and quickly detached and which is provided with suitable hangers for mounting the support on the side of a vehicle body and which is provided with means for preventing the support and hangers from mutilating the appearance of the vehicle bodies. Other objects and advantages will be fully explained in the following description and the invention will be more particularly pointed out in the claims.

Reference is had to the accompanying drawings which form a part of this application.

Fig. 1 is a perspective view of the support and a dotted outline of a tray.

Fig. 2 is a side elevation, showing the position of the tray relative to the side of the vehicle which is shown in dotted outline.

Fig. 3 is a perspective view, showing the support made adjustable.

Similar characters of reference are used to indicate the same parts throughout the several views.

The support is provided with a rectangular frame composed of bars 1, 2, 3, and 4 which are riveted together to make a rigid structure. A cross bar or rod 5 is attached to the bars 2 and 4 for bracing the support and also for forming a keeper for the side brace 6. The support is provided with tray engaging fingers 7 which are attached to the frame members 1 and 3. A cross bar 8 is attached to the frame members 1 and 3 to co-operate with the frame members 1 to 4 to form the support. Tray engaging fingers 9 are formed on the bar 8 to co-operate with the fingers 7 for holding the tray. The ends of the bars 1 and 3 are bent downwardly approximately at right angles to form supporting legs 10 so that the tray may be set on a counter or table. These legs 10 are provided with rubber tips 11 so that the tray will not mutilate the counter or table or the side of the vehicle body. The ends of the bar 4 are bent under the bar 4 and parallel thereto and provided with rubber pads 12 to rest on the top of the side of the vehicle body. The brace 6 is also provided with a rubber tip 13 to prevent mutilation of the side of the vehicle body. The support is mounted on the vehicle body by placing the pads 12 on top of the edge and then detaching the brace 6 from its keeper 14 and bringing the same down on the outside of the vehicle body with the pad 13 bearing against the side of the body. The tray is placed on the support and held in place thereon by the fingers 7 and 9 and the support is held on the vehicle body by the rubber tipped holders or legs 11 and by the rubber tipped brace 6.

Fig. 3 shows expansible bars 15 for carrying the fingers 7 and an expansible bar 16 for carrying the fingers 9. The fingers 9 and 7 may be expanded or contracted to hold trays of different sizes.

What I claim is—

1. A detachable tray support comprising a four sided frame, two of said frame members being parallel tray engaging members and having the ends thereof bent at right angles downwardly and forming supporting legs, fingers attached to said tray engaging members and curved upwardly to engage a tray and a cross brace attached to said parallel tray engaging members and having its ends curved upwardly and outwardly to form tray engaging fingers, parallel bracing members attached to said tray engaging members and one of said members having loops formed on the ends thereof and rubber pads thereon to form rests for the support on a vehicle, the legs adjacent to said loops having rubber pads thereon for engaging the side of the vehicle, and a brace operatively connected to said support and adapted to rest against the side of the vehicle to support the side of the tray remote from the vehicle.

2. A detachable tray support comprising a frame having two tray engaging sides bent at right angles downwardly at their ends to form supporting legs and provided with laterally projecting members having fingers curved upwardly and outwardly for engaging a tray, a transverse bar attached to said laterally projecting members and fingers formed thereon and curved outwardly and upwardly for engaging the edges of a tray, said frame having longitudinal sides for bracing purposes and one longitudinal side having padded loops formed on the ends and bent downwardly to form rests for supporting the tray on the edge of the vehicle, and a cross bar attached to said frame and an angular brace pivotally connected to said cross bar and adapted to bear against the side of the vehicle and to co-operate with said legs and cross bar to support the outer end of said frame.

In testimony whereof, I set my hand, this 20th day of July, 1926.

RICHARD C. NELMS.